Aug. 18, 1959

V. B. MOMBERG 2,900,501

SUBTRACTING CIRCUIT

Filed Aug. 15, 1955

INVENTOR
VERNON B. MOMBERG

BY

ATTORNEYS

United States Patent Office 2,900,501
Patented Aug. 18, 1959

2,900,501
SUBTRACTING CIRCUIT

Vernon B. Momberg, Coronado, Calif.

Application August 15, 1955, Serial No. 528,567

1 Claim. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

The present invention relates to a subtracting circuit and more particularly to a subtracting circuit having an application in a radar unit for increasing the signal-to-background ratio.

The energy contained in many radar echoes of small targets is only slightly more intense than the energy returning from the surrounding area thereby resulting in a heavy background trace. This background trace is undesirable for it increases radar operator fatigue as well as chances for error and thus should be eliminated if possible. Reduction in receiver gain to relieve scope background, which usually occurs during the initial section of the sweep, causes an equal loss in sensitivity during the remainder of the sweep when it is needed most because of the increased range of the target and therefore decreased strength of the target signal. The development of the logarithmic receiver has to a very great degree overcome the lack of increased system gain at the longer ranges by controlling the receiver gain in inverse proportion to the strength of the target (or background) signal; i.e. strong signals receive little amplification, weak signals receive great amplification. The result of this system is to compress all very strong signals (target and background) to approximately the same scope brilliance. This occurs because the very strong background signal drives the receiver close to its minimum gain, therefore any other signal, even though it may be greater in strength, will be reduced to nearly the background brilliance. This occurs in the presence of high sea return and has the effect of driving the target signal down into the sea return; i.e. decreasing the signal-to-background ratio.

Rather than decrease the signal-to-background ratio it would obviously be more desirable to increase this ratio, viz. increase the amplitude of the target signal above the background so that the target signal will appear brighter on the indicator scope. At the same time the maintenance of receiver sensitivity over the entire radar range should be retained as in the log receiver. The present invention comprises a subtracting circuit for clipping received voltages at approximately the peak of the sea return level and passing all signals above this. If the target signal is greater in magnitude than the sea return, the signal-to-background ratio may thereby be increased tenfold or better. The resultant signal requires amplification to normal value again but this has no effect on the ratio.

Accordingly an object of the present invention is the provision of a subtracting circuit for clipping the bottom portion of an input wave.

Another object is to provide a subtracting circuit for passing only the peaks of an input wave.

A further object of the present invention is the provision of a subtracting circuit for increasing the signal-to-background ratio of a received radar signal.

Still another object is to provide a subtracting circuit for subtracting from a received radar wave containing a background and a target signal, a voltage which is a function of the background signal.

Other objects and many of the attendant advantages of this invention will be readily appreciated as the same becomes better understood by reference to the following detailed description when considered in connection with the accompanying drawings wherein.

Figure 1:
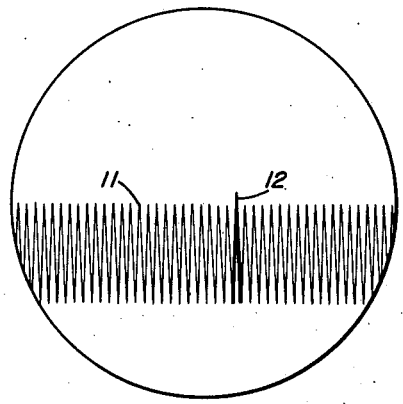
Fig. 1 is an "A" scope presentation of the target signal obscured by the background signal.

Referring now to the drawings, wherein like reference characters designate like or corresponding parts throughout the several views, there is shown in Fig. 1 an "A" scope presentation from a conventional radar unit. The background signal 11 is of approximately the same amplitude as the target signal 12, thereby rendering interpretation of this presentation relatively difficult and fatiguing.

Figure 2:
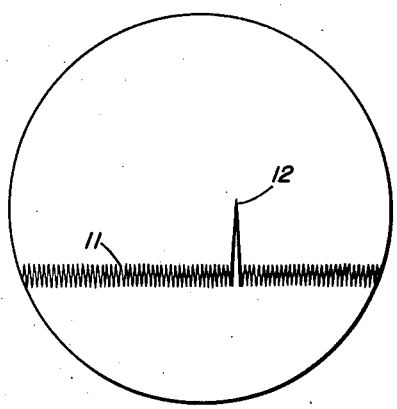
Fig. 2 is an "A" scope presentation of the target signal and background signal produced by a radar unit employing the subtracting circuit of this invention.

In Fig. 2 there is shown the improved presentation obtained through the utilization of this invention. The signal-to-background ratio of this presentation is substantially increased over that of the presentation of Fig. 1.

Figure 3:
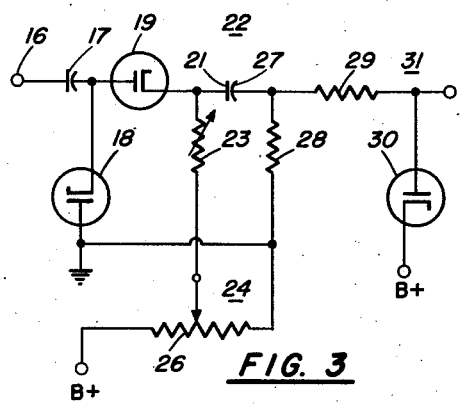
Fig. 3 illustrates one embodiment of this invention.

In Fig. 3, the input target signals, which preferably have been amplified, are applied at terminal 16 and coupled by capacitor 17 to the cathode of diode 18 and the plate of diode 19. Although the use of diodes is desirable, it is not a necessity, and any low-impedance rectifying elements are suitable. The plate of diode 18 is grounded and the cathode of diode 19 is joined to plate 21 of capacitor 22 and one end of a large variable resistor 23. The other end of variable resistor 23 is connected to a D.C. variable-voltage source 24, here shown to be a potentiometer arrangement comprising variable resistance unit 26 and D.C. source B+. The other plate 27 of capacitor 22 is connected to small resistor 28 across which the output voltage is developed. In some applications it may be useful to follow the subtracting circuit with a positive limiting circuit 31 such as is comprised by resistor 29, diode 30, and voltage source B+, but the subtracting circuit is not limited to the use therewith.

Figure 4:
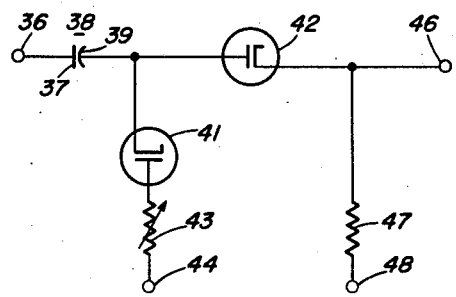
Fig. 4 shows another embodiment of this invention.

In the embodiment of Fig. 4, the input target signals are applied at terminal 36 which is connected to plate 37 of capacitor 38. The other plate 39 of capacitor 38 is affixed to the cathode of diode 41 and the plate of diode 42. As in the system of Fig. 3, the use of diodes in this circuit is not required. The plate of diode 41 is joined by a large variable resistor 43 to terminal 44 which is normally grounded. The cathode of diode 42 is attached to output terminal 46 and small resistor 47 across which the output voltage is generated. One end of resistor 47 is connected to terminal 48 which is normally grounded.

Figure 5:
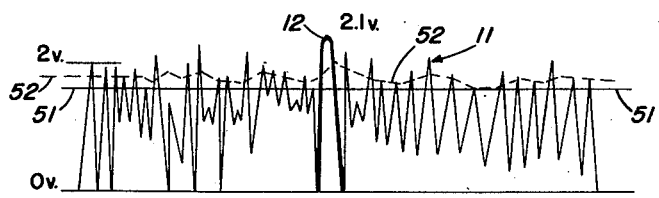
Fig. 5 is an "A" scope presentation illustrating the operation of this invention.

In the presentation of Fig. 5, the target signal 12 is shown encompassed by the varying background signal 11. A straight line 51 indicates the minimum voltage that is subtracted, which is also the voltage setting of D.C. source 24 of Fig. 3 and terminal 44 of Fig. 4, and uneven line 52 shows the voltage that is actually subtracted which is the potential across capacitor 22 of Fig. 3 and across capacitor 38 of Fig. 4.

As a result of its large capacity, capacitor 17 of Fig. 3 couples the input signals to the subtractor circuit with little attenuation. It is preferred that previous stages have converted the input signal to a positive polarity since diode 18 is poled to clip all negative signals. The positive signal will raise the potential of the plate of diode 19 above that of its cathode thereby producing conduction. Electrons will then flow from plate 21 of capacitor 22, as well as from ground through resistor 23, to capacitor 17. Electrons flow also from ground through resistor 28 to plate 27 of capacitor 22. Due to the largeness of capacitor 17 and resistor 23 and the smallness of capacitor 22 and resistor 28, capacitor 22 charges up to approximately the peak of the input voltage before the voltage across capacitor 17 can change appreciably. The decadence of the charge on capacitor 22 is controlled by the setting of variable resistor 23, but regardless of this setting the voltage on capacitor 22 can not decrease below the potential established by source 24. When the subtractor circuit is first set into operation, the voltage across capacitor 22 is that of source 24 which is line 51 of Fig. 5. An input positive peak of the input target signal 12 or background signal 11 which does not exceed the voltage on capacitor 22 will not be passed by the subtractor circuit as the cathode of diode 19 is then more positive than its plate and thus can not conduct. But an input peak larger than this voltage will render diode 19 conductive, capacitor 22 charges, and the charging current through resistor 28 produces the output voltage. After capacitor 22 charges to approximately the peak, diode 19 is cut off and then capacitor 22 discharges slowly through the series combination of large resistor 23 and small resistor 28. For another input voltage peak to appear in the output, it must exceed the voltage across capacitor 22 which due to its increased charge is now at line 52 of Fig. 5. Thus, only the peaks of the input signals are passed, those above line 52 of Fig. 5, and this greatly increases the signal-to-background ratio which can be seen as follows: assume the input target signal to be 2.1 volts and the input background signal to be 2 volts, then the signal-to-background ration is 2.1/2 or 1.05, but if the subtracting circuit subtracts 1.9 volts from both signals then the target signal is .2 volt and the background signal is .1 volt and the signal-to-background ratio is .2/.1 or 2. Limiter 31, in conventional fashion, clips all output signals that exceed the potential on the cathode of diode 30. This action is advantageous when background peak voltages are of short time duration but of greater strength than the target signal. The control of the voltage applied to the cathode of diode 30 could very well be linked to the control of potentiometer 24 and thereby provide a constant difference voltage band to be passed to the following video amplifiers of the radar system.

The action of the circuit of Fig. 4 is quite similar to the circuit of Fig. 3, the main distinction being that the charging capacitor 22 of Fig. 3 is joined to the cathode of series diode 19, and the charging capacitor 38 of Fig. 4 is connected to the plate of series diode 42. If the input positive voltage applied at terminal 36 exceeds the charge on capacitor 38, which is never less than the potential at terminal 44, diode 42 conducts and a charging current flows through output resistor 47, through diode 42, to capacitor 38, thereby establishing an output voltage across resistor 47. The voltage across capacitor 38 is then at line 52 of Fig. 5. After capacitor 38 charges, diode 42 ceases conduction and capacitor 38 commences to discharge slowly through diode 41 and large resistor 43. In no event can capacitor 38 discharge to a potential which is less than that at terminal 44, line 51 of Fig. 5. If it is desired, this subtracting circuit could also be followed by a limiter.

Subtracting circuits have been disclosed for subtracting a selective amount of voltage from an input wave. Although this invention has general utility, it is especially useful in a radar circuit for increasing the signal-to-background ratio, thereby lessening operator fatigue and increasing accuracy.

Obviously many modifications and variations of the present invention are possible in the light of the above teachings. It is therefore to be understood that within the scope of the appended claim the invention may be practiced otherwise than as specifically described.

What is claimed is:

A subtracting circuit for subtracting a selectable portion of an input wave, said circuit comprising: an input terminal for connection to a circuit for receiving said input wave, a charging capacitor having a positive plate and a negative plate, leads for connecting said positive plate to said input terminal, a first diode, a second diode, leads for joining said negative plate to the plate of said first diode and the cathode of said second diode, a bias terminal for connection to a source of variable bias, a variable resistor connected between the plate of said second diode and said bias terminal, a grounded output resistor, an output terminal, and leads for connecting the ungrounded end of said output resistor and the cathode of said first diode to said output terminal.

References Cited in the file of this patent

UNITED STATES PATENTS

| | | |
|---|---|---|
| 2,259,532 | Nicholson | Oct. 21, 1941 |
| 2,490,530 | Loughlin | Dec. 6, 1949 |
| 2,497,693 | Shea | Feb. 14, 1950 |
| 2,676,250 | Trousdale | Apr. 20, 1954 |